(12) United States Patent
Sviberg et al.

(10) Patent No.: US 9,533,554 B2
(45) Date of Patent: Jan. 3, 2017

(54) TOP OF A CONVERTIBLE VEHICLE HAVING A CLOSING SYSTEM

(71) Applicant: Webasto-Edscha Cabrio GmbH, Stockdorf (DE)

(72) Inventors: Magnus Sviberg, Stockdorf (DE); Alexander Haimerl, Stockdorf (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/880,497

(22) Filed: Oct. 12, 2015

(65) Prior Publication Data

US 2016/0101673 A1   Apr. 14, 2016

(30) Foreign Application Priority Data

Oct. 13, 2014   (DE) ......................... 10 2014 114 804

(51) Int. Cl.
*B60J 7/185*   (2006.01)
*B60J 7/19*   (2006.01)

(52) U.S. Cl.
CPC ............. *B60J 7/196* (2013.01); *B60J 7/1851* (2013.01)

(58) Field of Classification Search
CPC ........... B60J 7/15; B60J 7/1851; B60J 7/1853; B60J 7/1858; B60J 7/196; B60J 7/19
USPC ..................................... 296/120.1, 121, 128
See application file for complete search history.

(56) References Cited

U.S. PATENT DOCUMENTS

| 5,413,390 | A | * | 5/1995 | Filippi | B60J 7/192 292/110 |
| 6,666,482 | B2 | | 12/2003 | Hansen et al. | |
| 2006/0192408 | A1 | * | 8/2006 | Queveau | B60J 7/0061 296/107.01 |
| 2009/0218828 | A1 | * | 9/2009 | Schumacher | B60J 7/185 292/217 |
| 2009/0261625 | A1 | * | 10/2009 | Guetet | B60J 7/196 296/224 |
| 2014/0300131 | A1 | * | 10/2014 | Kopp | B60J 7/1856 296/116 |
| 2015/0306942 | A1 | * | 10/2015 | Heidan | B60J 7/024 296/216.02 |

(Continued)

FOREIGN PATENT DOCUMENTS

| DE | 10121858 A1 | 11/2002 |
| DE | 102004027378 A1 | 12/2005 |

(Continued)

*Primary Examiner* — Gregory Blankenship
(74) *Attorney, Agent, or Firm* — Quarles & Brady LLP

(57) ABSTRACT

A top of a convertible vehicle includes at least one top element displaceable between a closed position and a storage position. Each of two side portions accommodates a closing system fixing the relevant side portion to a front apron of the vehicle or to a further top element. The closing systems are displaceable between a blocked position and a cleared position. Each closing system includes a locking hook, which interacts with a corresponding locking element and which is pivotable about a hook axis, and a drive unit, which drives a control element pivotable about a pivot axis and mounted at the relevant side portion as well as being connected to the locking hook via a coupling unit. The pivot axis of the control element and the hook axis are oriented with respect to each other in a skew fashion and the coupling unit includes at least one 3-D link.

13 Claims, 7 Drawing Sheets

(56) References Cited

U.S. PATENT DOCUMENTS

2016/0101673 A1* 4/2016 Sviberg .................. B60J 7/196
                                                              296/117

FOREIGN PATENT DOCUMENTS

| DE | 102007021083 A1 | 11/2008 |
| DE | 102009004038 B4 | 9/2010 |

* cited by examiner

TOP OF A CONVERTIBLE VEHICLE HAVING A CLOSING SYSTEM

CROSS REFERENCE TO RELATED APPLICATION

This application claims the priority benefit of German Patent Application No. 10 2014 114 804.5 filed on Oct. 13, 2014, which is fully incorporated herein by reference.

STATEMENT REGARDING FEDERALLY SPONSORED RESEARCH OR DEVELOPMENT

Not applicable.

FIELD OF THE INVENTION

The invention relates to a top of a convertible vehicle.

BACKGROUND OF THE INVENTION

Such a top is known, for example, from document DE 10 2007 021 083 A1 and constitutes a displaceable top of a passenger car being realized as a convertible vehicle. The top comprises a top element, which may be realized as a rigid lid element and which is displaceable between a closed position for spanning a vehicle interior and a storage position for clearing the vehicle interior to the top. The top element, in relation to a vertical longitudinal center plane of the top on both sides, is provided with a side portion or frame portion, which, in relation to a vertical longitudinal center plane of the top, limits or forms a lateral edge of the top element. In each of the side portions being arranged on both sides, a closing system is accommodated, which includes a hydraulic cylinder, which drives a locking hook via a rocker and a connecting link, said locking hook, in the closed position of the top, being engaged with a locking bolt being arranged to a front apron of the relevant vehicle and the pivot axis of said locking hook being oriented so as to be parallel to the pivot axis of the rocker. The design of the rocker and its mode of coupling to the locking hook require a sufficiently large installation space in the vertical direction of the top. Said installation space is not available in all types of tops.

SUMMARY OF THE INVENTION

It is the object of the invention to create a top of the kind referred to in the introduction, which can be realized so as to have the optimum installation space regarding the closing systems being accommodated in the side portions, as a function of the respective top design.

This object is attained in one embodiment of the invention in a top of a convertible vehicle including a closing system in side portions, wherein a driven control element has a pivot axis, which lies in another plane than the pivot axis of a locking hook, which interacts with a corresponding locking element. In mathematical sense, the two axes are skew lines. The control element and the locking hook are coupled by a 3-D link.

A 3-D link, in the present context, should be understood to be a link being able to moving, upon actuation of the drive unit and consequently upon pivoting of the control element, spatially and not only in one plane. The prerequisite for this is that the link is linked to the structural elements to be coupled via a joint, which allows for a multidimensional movement, for example via a ball-and-socket joint or via a joint being realized as a cardanic joint.

The side portions of the top according to the invention may be formed by lateral frame elements, which laterally limit the top element, which may be realized as a rigid roof segment or also as a top cloth, and are part of a linkage. In a top having a single rigid top element without any further linkage, the side portions may also only be the lateral regions of said rigid top element.

The locking hook of the top according to the invention in particular serves to link the top to a front apron of the relevant vehicle in the closed position of the top. In this case, the locking hook is engaged with a locking element being realized at the apron.

Through the inventive mode of coupling the control element and the locking hook, it is possible to freely position the drive unit of the closing system spatially as against the locking hook. Consequently, as a function of the respective application, the respective installation space supplied can be respected, such that, in the relevant vehicle interior, an optimized space can be supplied and that there is also more freedom regarding the design of the relevant vehicle. The closing system being designed in accordance with the invention may be put to use in different manners in various tops, without changes to the basic concept being required hereunto. Additionally, the closing system can be at low cost and also optimized with respect to weight.

The drive unit of the closing system of the top according to the invention may comprise a handle, such that the closing system can be actuated manually. Alternatively or also in addition, the drive unit may comprise a motor drive, in particular a hydraulic cylinder or an electric motor.

In a special embodiment of the top according to the invention, the hook axis extends, at least nearly, in the transverse direction of the top and the pivot axis of the control element extends, at least nearly, in the vertical direction of the top, in each instance in relation to the closed position of the top. Consequently, the pivoting movement of the control element is effected in an at least nearly parallel fashion to the plane of the top, that means in an at least nearly horizontal plane, such that only a small installation space in the vertical direction of the top has to be supplied for the pivoting movement of the control element. This, in turn, has an advantageous impact on the possible head clearance for vehicle passengers in the closed position of the top.

The control element, which can be driven using the drive unit, can be a simple control lever or also a control plate. The 3-D link is linked to the control lever or control plate. In principle, the control element can freely be positioned at the relevant side portion. Consequently, it can be implemented in different types of tops.

In order to secure the closing system against being displaced inadvertently into the cleared position, the 3-D link, in an advantageous embodiment of the top according to the invention, has a main axis, which, in the blocked position of the closing system, assumes an over center relating to the control element. A moment onto the locking hook, which acts in the cleared position thereof, consequently cannot introduce any pivoting movement into the control element, which movement would act in the direction of the cleared position of the closing system. The control element may only be moved out of its position being associated with the blocked position using the drive unit.

The closing system of the top according to the invention may, aside from the locking hook, comprise a further locking arrangement, which makes it possible to fix the side portion to an edge facing away from the locking hook and which interacts with a corresponding counterpart at a further vehicle element. For example, the further vehicle element is a frame element, which, in the closed position of the top, adjoins a front frame element. Alternatively, the further vehicle element is a component which is fixed relative to the body, and at which the side portion can be secured in addition.

The locking arrangement can equally be actuated using the control element, to be more precise in particular via a second 3-D link.

For securing the blocked position of the closing system, the second 3-D link also has a main axis, which, in the blocked position of the closing system, assumes an over center relating to the control element.

In a special embodiment of the top according to the invention, the locking arrangement comprises a locking pin being axially slidable in a housing. Said locking pin is engaged with a corresponding locking recess in the blocked position of the closing system.

Further advantages and advantageous configurations of the subject-matter of the invention can be taken from the description, from the drawing and from the claims.

BRIEF DESCRIPTION OF THE DRAWINGS

In the drawing, two exemplary embodiments of a top according to the invention are illustrated in a schematically simplified way and will be explained in more detail in the following description. In the figures.

DETAILED DESCRIPTION OF AN EMBODIMENT

Figure 1:
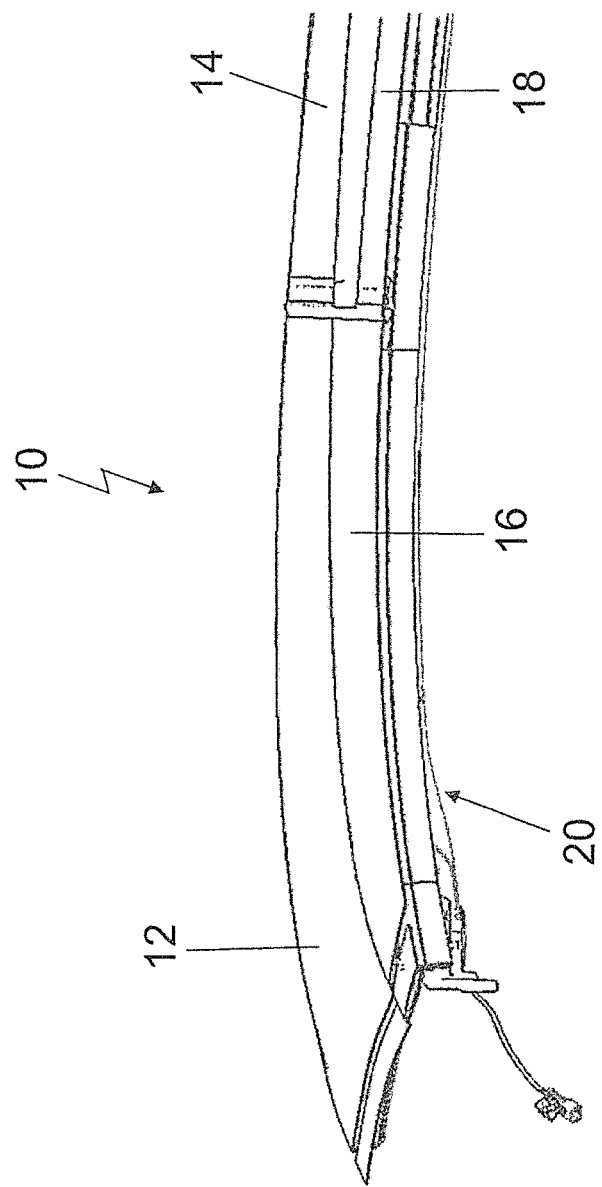
FIG. 1 shows a side view of a front top region of a top according to the invention in the closed position thereof.

In FIG. 1, a front portion of a top 10 of a convertible vehicle is illustrated, which top is realized as an RHT (Retractable Hard Top) and thus consists of multiple rigid roof segments being arranged one behind the other in the closed position, a front roof segment 12 and a middle roof segment 14 being illustrated from amongst said roof segments in FIG. 1. In the closed position, the front roof segment 12, with its front edge, is adjacent to a front apron of the relevant vehicle, which forms an upper frame portion extending in the transverse direction of the vehicle and pertaining to a vehicle windshield.

The top 10 comprises a linkage which is not illustrated in more detail in the present drawing for reasons of clarity, and which, in relation to a vertical longitudinal center plane of the top on each of its two sides, includes a link arrangement, at which a side portion 16 of the front roof segment 12 and a side portion 18 of the middle roof segment 14 are mounted.

In the drawing, only the region of the top 10 being arranged on the left in the forward direction of travel of the relevant vehicle is illustrated. The region being arranged on the right is realized in a mirror-symmetrical fashion and thus equally follows inevitably from the following description.

Figure 2:
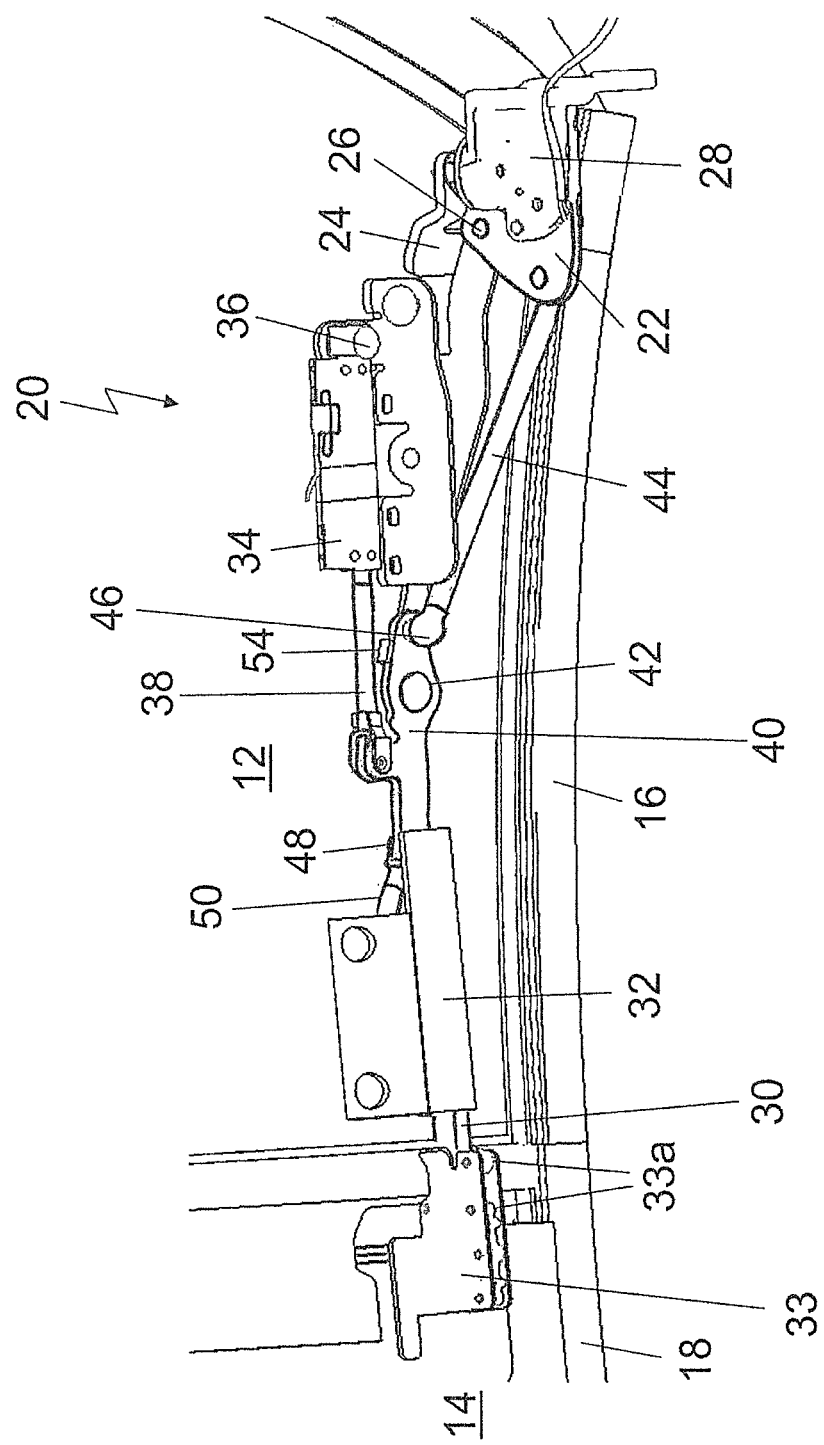
FIG. 2 shows a view of a closing system of the top according to FIG. 1 in the blocked position.
Figure 3:
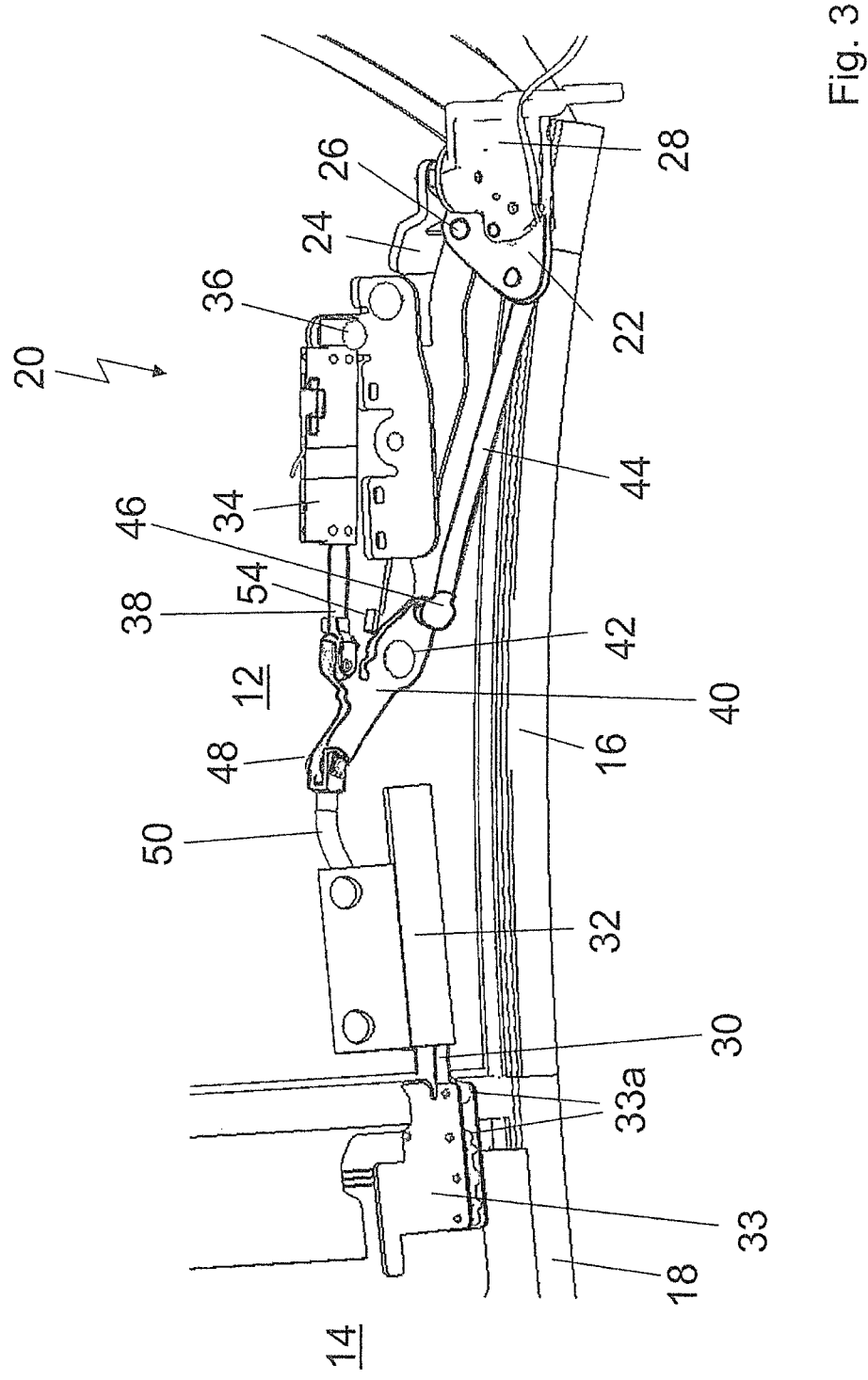
FIG. 3 shows a view corresponding to FIG. 2, but during displacement of the closing system, in an intermediate position.
Figure 4:
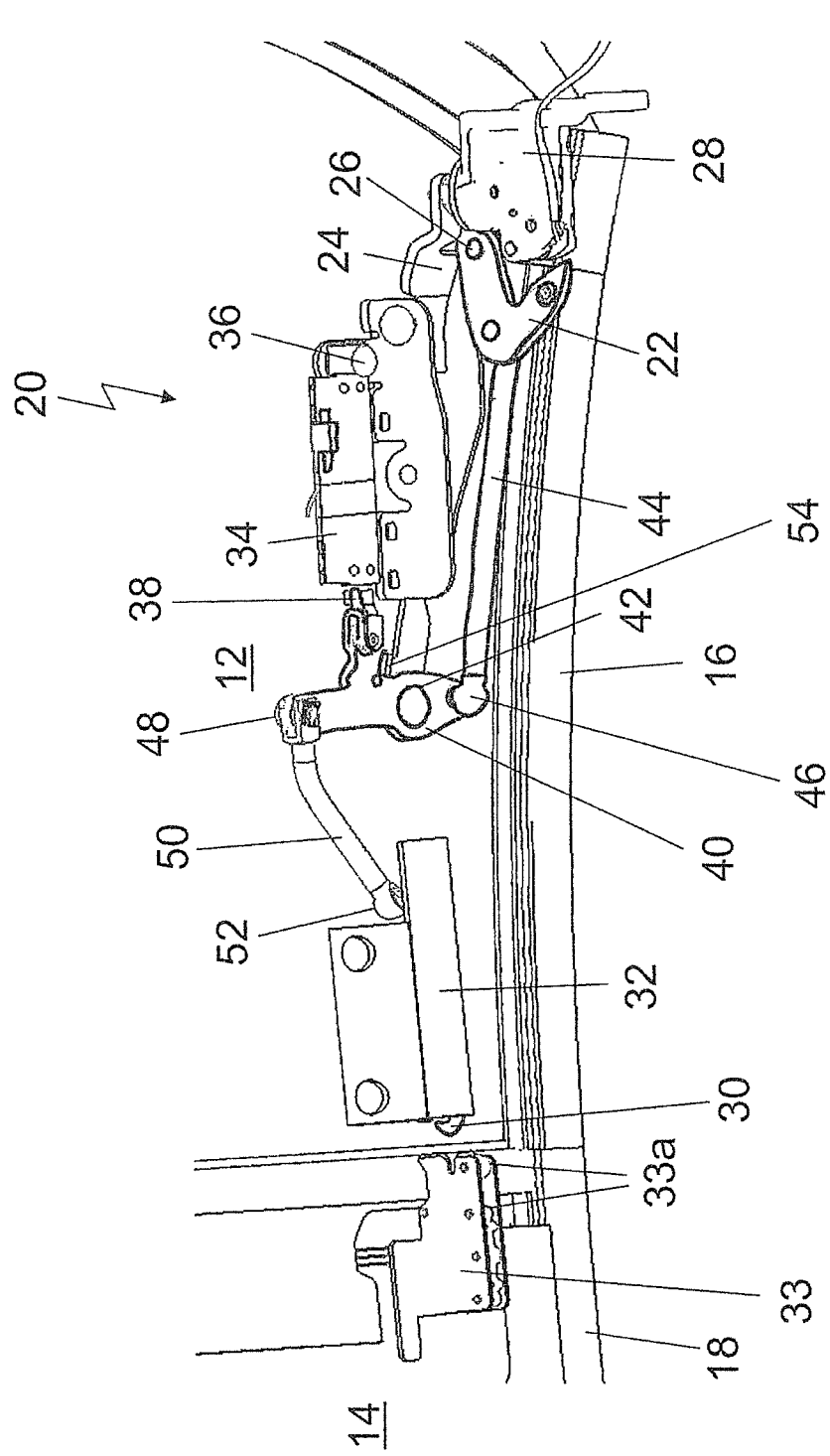
FIG. 4 equally shows a view corresponding to FIG. 2, but in the cleared position of the closing system.

In order to fix, in the closed position of the top, the front roof segment 12 to the front apron of the vehicle, and to secure the front roof segment 12 as against the middle roof segment 14, the top 10, in relation to the vertical longitudinal center plane of the top on each of its two sides, includes a closing system 20, which is illustrated in more detail in FIGS. 2 to 4. The closing system 20 is accommodated by the respective side portion 16 of the front roof segment 12.

The closing system 20 comprises a front locking hook 22, which is mounted at a closing bearing 24 so as to be pivotable, which closing bearing is fixed to the front roof segment 12 constituting a stamped/bent part. The locking hook 22 has a pivot or hook axis which is formed by a bearing stud 26, and which extends in the transverse direction of the vehicle, and is pivotable between a blocked position being illustrated in FIG. 2 and a cleared position being illustrated in FIG. 4. In its blocked position, the locking hook 22 is engaged with a counterpart 28 which is realized at the front apron, and which comprises a locking stud. Additionally, a centering pin, which is realized at the closing bearing 24, positively sinks into a corresponding geometry of the counterpart 28.

At its end 22 facing away from the locking hook, the closing system 20 is provided with a locking pin 30 which constitutes a further locking arrangement, and which is arranged so as to be axially slidable in a housing 32 being attached to the front roof segment 12. The locking pin 30, in its closed position, engages with a counterpart 33 being fixed to the middle roof segment 14. The counterpart 33 includes multiple pulleys 33a, which roll off at the locking pin 30 when the same is being displaced.

For actuating the locking hook 22 and the locking pin 30, the closing system 20, as a drive unit, includes a hydraulic cylinder 34, which is mounted, via a bearing point 36, at the closing bearing 24 so as to be pivotable and is attached to a control element 40 with its piston 38, which control element is realized as a control plate or control lever. The control element 40, via a bearing pin 42, is equally mounted at the closing bearing 24 so as to be pivotable. Through the bearing pin 42, a pivot axis is defined, which is realized at right angles with respect to the pivot axis of the locking hook 22. This means that the pivot axis of the locking hook 22 and the pivot axis of the control element 40 are arranged with respect to each other in a skew fashion.

In order to be able to convert a pivoting movement of the control element 40 into a pivoting movement of the locking hook 22, the closing system 20 includes a coupling link 44 which is realized as a 3-D link, and which is linked, on the one hand, to the control element 40 via a ball head 46 and, on the other hand, to the locking hook 22 via a further ball head being covered by the locking hook 22 in the drawing.

Furthermore, the control element 40 is connected to a coupling rod 50 via a joint 48, which coupling rod is linked to the locking pin 30 via a ball head 52.

In order to define an end position of the control element 40 being associated with the blocked position of the closing system 20, the closing bearing 24 includes a stop 54, against which the control element 40 abuts in said end position. The locking hook 22 then assumes its blocked position, in which it is engaged with counterpart 28, and the locking pin 30 assumes its blocked position, in which it is engaged with counterpart 33, which is arranged at the middle roof segment 14.

In the blocked position, the main axis of the coupling link 44 and the main axis of the coupling rod 50 are oriented such that they assume an over center relating to the control element 40, that means a force being exerted in the axial direction in each instance acts in the blocked position of the control element 40 such that the latter is pressed in the direction of the stop 54. Inadvertent displacement of the closing system 20 in the cleared position is prevented in this way.

Figure 5:
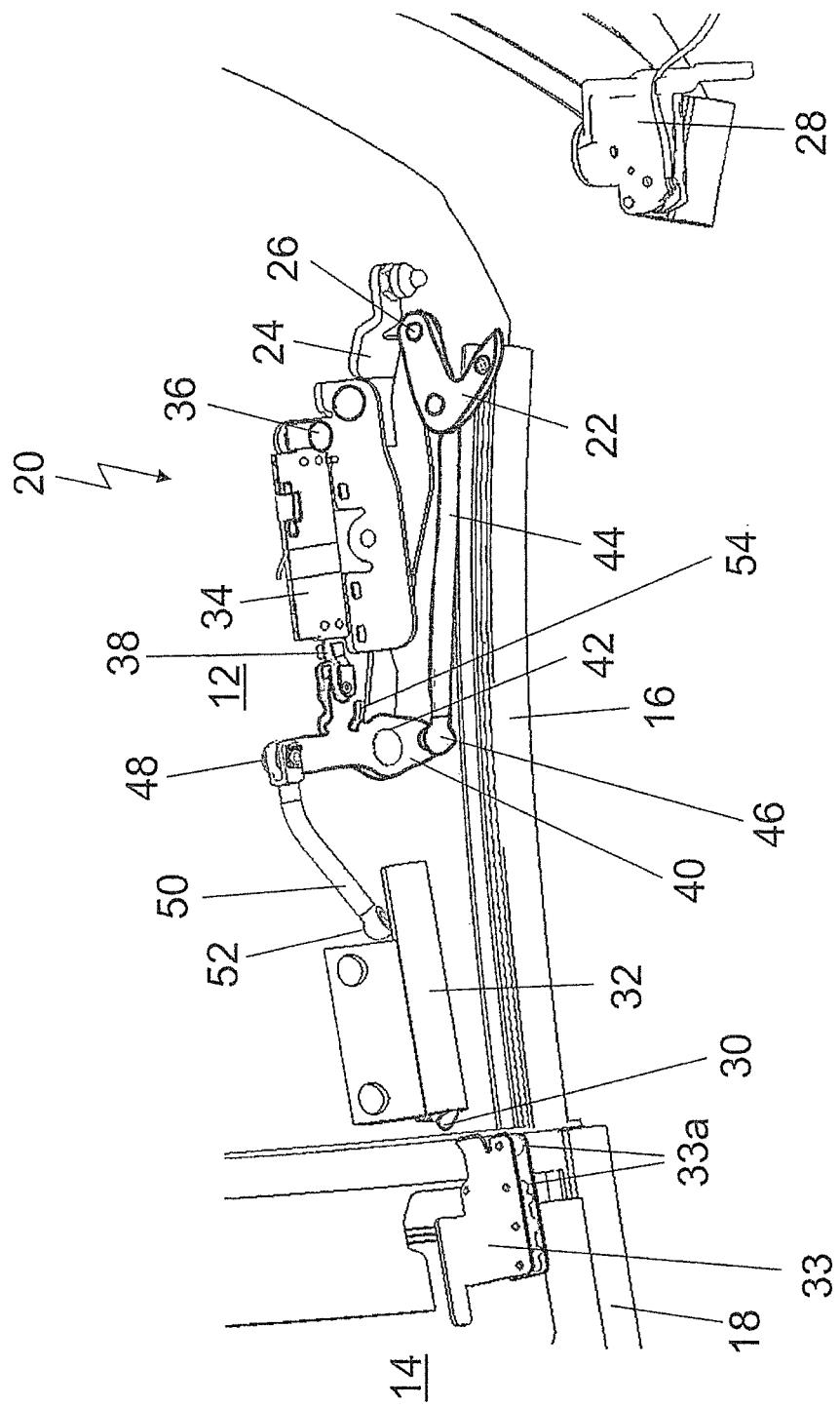
FIG. 5 equally shows a view corresponding to FIG. 2, but while the top is being opened.

When displacing the closing system 20 from the blocked position being illustrated in FIG. 2 into the cleared position being illustrated in FIG. 4, the control element 40 being realized as a turntable, using the drive unit, that means in the motor embodiment using the hydraulic cylinder 34, is rotated about the axis that extends in the vertical direction of the top, away from the stop 54, until it strikes against a further stop which is realized at the front roof segment 12, and which is associated with the cleared position. Consequently, via the coupling link 44, an opening moment is exerted onto the locking hook 22, and, via the coupling rod 50, an opening moment is exerted onto the locking pin 30. The front roof segment 12 is detached from the front apron of the vehicle and from the middle roof segment 14 such that it can be pivoted using the linkage (cf. FIG. 5).

Figure 6:
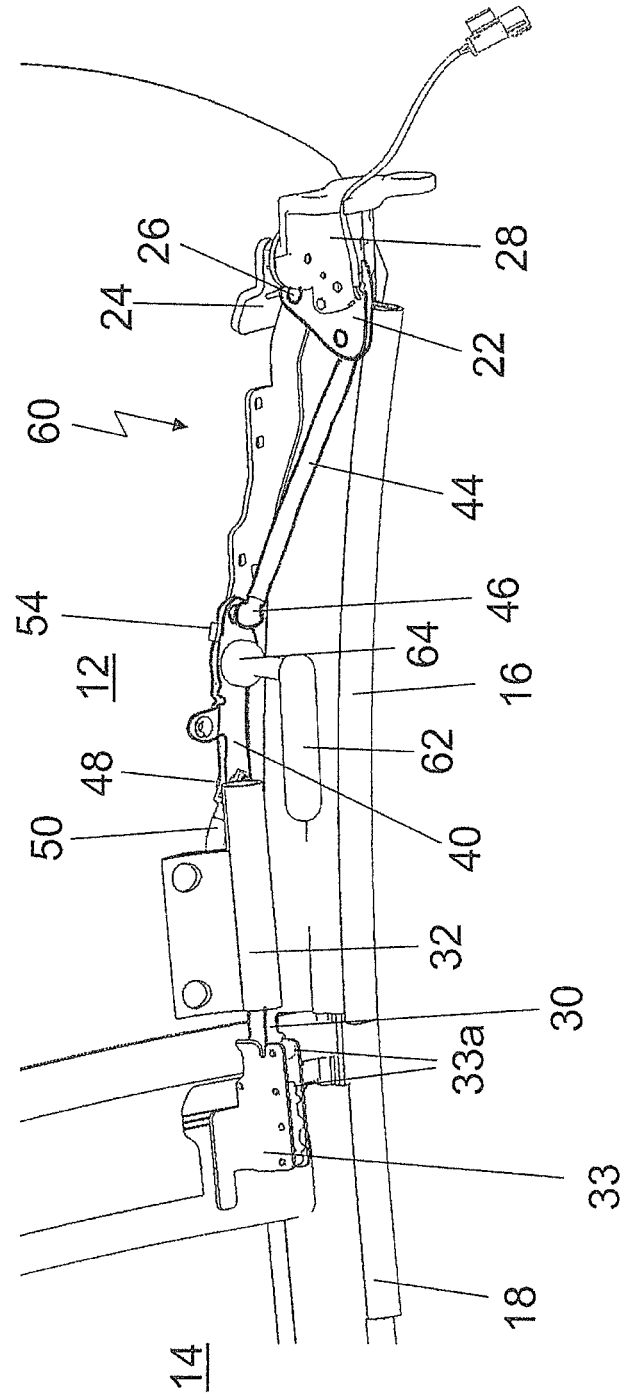
FIG. 6 shows a view of a closing system that can be actuated manually, for the top being illustrated in FIG. 1, in the blocked position.
Figure 7:
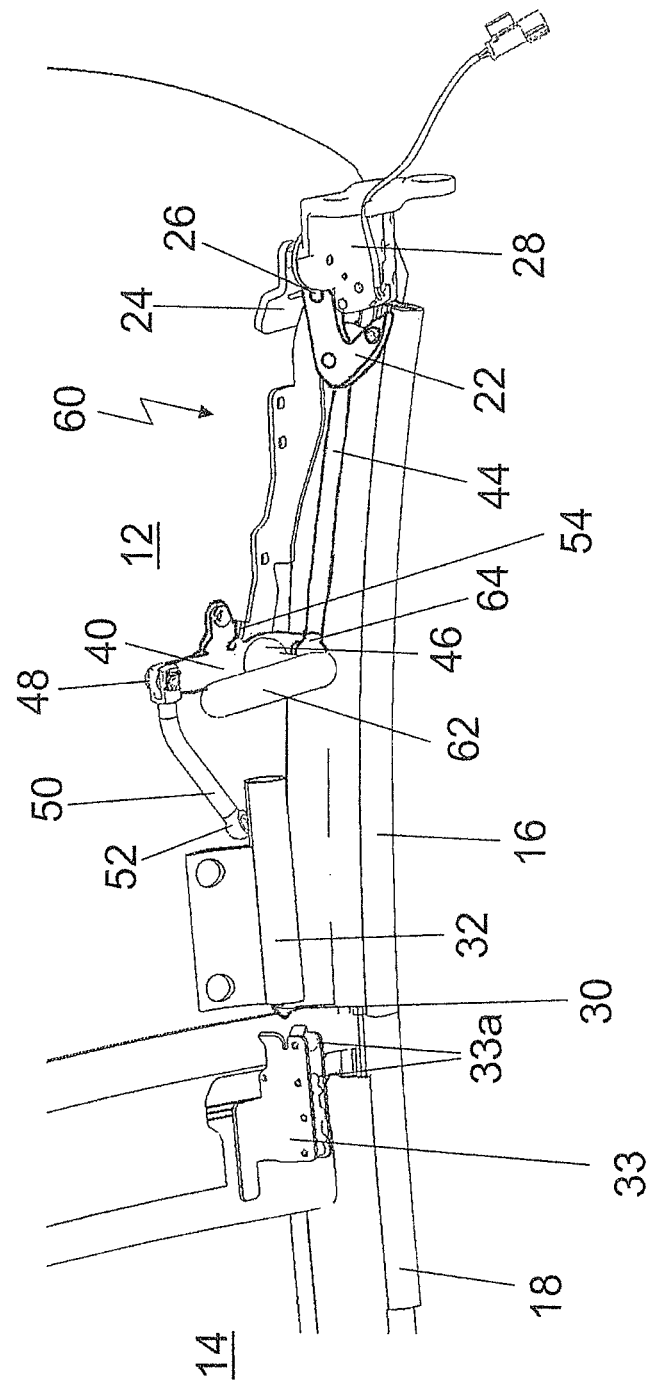
FIG. 7 shows the closing system according to FIG. 6 in the cleared position.

In FIGS. 6 and 7, a second embodiment of a closing system 60 is illustrated. The closing system 60 differs from the closing system being illustrated in FIGS. 2 to 5 in that it can be actuated manually and does not include any motor drive. For manual actuation, the closing system includes a handle 62 as drive unit, which handle is pivotable about a bearing axis, which coincides with the pivot axis of the control element 40. The handle 62 consequently has a shank 64, which forms the bearing pin for the control element 40. Alternatively, a gearbox or a linkage may be arranged between the handle 62 and the control element.

Manually displacing the handle 62 about the bearing axis leads to the control element being pivoted and consequently to the closing system 60 being displaced between the blocked position and the cleared position.

Apart from that, the closing system 60 corresponds to the closing system being illustrated in FIGS. 2 to 5. Therefore, reference is made to the remarks above relating to the same.

The invention claimed is:

1. A top of a convertible vehicle comprising:
   at least one top element displaceable between a closed position spanning a vehicle interior and a storage position;
   a side portion on each side of a vertical longitudinal center plane of the top;
   a pair of closing systems, each closing system of said pair of closing systems being accommodated by one of said side portions and fixing the relevant side portion to a front apron of the vehicle or to a further top element, each closing system being displaceable between a blocked position and a cleared position and including a locking hook, which interacts with a corresponding locking element and which is pivotable about a hook axis, and a drive unit, which drives a control element pivotable about a pivot axis and mounted at the relevant side portion as well as being connected to the locking hook via a coupling unit, wherein the pivot axis of the control element and the hook axis are oriented with respect to each other in a skew fashion and the coupling unit includes at least one 3-D link.

2. The top according to claim 1, wherein the 3-D link is a ball headed link.

3. The top according to claim 1, wherein the 3-D link is a cardanic link.

4. The top according to claim 1, wherein the hook axis extends, at least nearly, in the transverse direction of the top and in that the pivot axis of the control element extends, at least nearly, in the vertical direction of the top.

5. The top according to claim 1, wherein the control element is a control lever or a control plate.

6. The top according to claim 1, wherein the 3-D link has a main axis, which, in the blocked position of the closing system, assumes an over center position relative to the control element.

7. The top according to claim 1, wherein the closing system includes a locking arrangement fixing the side portion to an edge facing away from the locking hook and interacts with a corresponding counterpart at a further vehicle element.

8. The top according to claim 7, wherein the locking arrangement is connected to the control element via a second 3-D link.

9. The top according to claim 8, wherein the second 3-D link has a main axis, which, in the blocked position of the closing system, assumes an over center position relative to the control element.

10. The top according to claim 7, wherein the locking arrangement comprises a locking pin axially slidable in a housing.

11. The top according to claim 7, wherein the further vehicle element is another side portion of the top or a component of the vehicle that is fixed relative to the body.

12. The top according to claim 1, wherein the drive unit includes a handle.

13. The top according to claim 1, wherein the drive unit includes a hydraulic cylinder or an electric motor.

* * * * *